United States Patent
Zorn

[11] Patent Number: 5,821,501
[45] Date of Patent: Oct. 13, 1998

[54] HEATED MIRROR

[75] Inventor: Heinz Zorn, Eggersdorf, Austria

[73] Assignee: EIP Equipment and Safety Products Ltd., Mississauga, Canada

[21] Appl. No.: 608,063

[22] Filed: Feb. 28, 1996

[51] Int. Cl.$^6$ .............. H05B 1/00; H05B 3/16; B60L 1/02; G02B 11/04

[52] U.S. Cl. .......... 219/219; 219/202; 219/543; 359/512

[58] Field of Search ................. 219/202, 203, 219/219, 522; 359/512, 513, 514

[56] References Cited

U.S. PATENT DOCUMENTS

| | | | |
|---|---|---|---|
| 2,564,836 | 8/1951 | Elsenheimer | 219/219 |
| 3,749,885 | 7/1973 | Nagasima | 219/522 |
| 3,790,748 | 2/1974 | Van Laethem et al. | 219/219 |
| 3,902,040 | 8/1975 | Ikeda et al. | 219/203 |
| 3,962,559 | 6/1976 | Drda et al. | 219/210 |
| 3,995,140 | 11/1976 | Kuiff et al. | 219/203 |
| 4,048,469 | 9/1977 | Ciarniello et al. | 219/203 |
| 4,071,736 | 1/1978 | Kamerling | 219/219 |
| 4,127,763 | 11/1978 | Roselli | 219/203 |
| 4,196,338 | 4/1980 | Edel | 219/203 |
| 4,352,006 | 9/1982 | Zega | 219/219 |
| 4,634,242 | 1/1987 | Taguchi et al. | 359/512 |
| 4,793,343 | 12/1988 | Cummins, Jr. et al. | 219/497 |
| 5,347,106 | 9/1994 | Reiser et al. | 219/219 |
| 5,594,585 | 1/1997 | Komatsu | 359/512 |

*Primary Examiner*—Teresa J. Walberg
*Assistant Examiner*—Sam Paik
*Attorney, Agent, or Firm*—Ridout & Maybee

[57] ABSTRACT

A heated mirror has a heating element thermally bonded to the rear surface and a transparent conductive coating applied to its front surface and divided by a narrow gap into portion between which the capacitance and resistance will be influenced by moisture. Changes in resistance and/or capacitance of the coating are sensed and used to control the leaking element so as to apply heat to the microns when fogging occurs.

9 Claims, 2 Drawing Sheets

HEATED MIRROR

FIELD OF THE INVENTION

This invention relates to a heated mirror, in particular an exterior mirror for a motor vehicle, of the type having an electrical heating element in thermal contact with the mirror and at least one temperature sensor, which acts in combination with a thermostatic switch for the electrical heating element.

REVIEW OF THE ART

Heated mirrors of this type are already in use as exterior mirrors for motor vehicles. With most such mirrors, the rear surface of the mirror, on which the mirror coating has been vapour deposited, is connected to resistance heating elements in the shape of strips, which elements are manually and/or thermostatically controlled.

It should not be necessary to heat a mirror located in the open air, or rather the exterior mirror of a motor vehicle, unless the temperature of the mirror surface falls below the dew-point of the surrounding air, or if it can no longer fulfil its function properly because its surface is fogged up or it is covered with ice or snow. The main reason why such mirrors located in the open air become unusable is an increased humidity which precipitates as condensation on the mirror surface.

It is known to provide controls for windshield wipers which are activated by the detection of moisture, and demisters for interior glass windows which are activated by moisture detectors, but to the best of my knowledge no such device has been proposed for external mirrors for vehicles. Additionally, the moisture detecting devices utilized in prior proposals have been located on a portion of the inside of the glass separate from that treated by the demister, an arrangement which would not be very practical within the limited area of a vehicle mirror, since not only is the moisture detecting element on the inside of the glass, but it obscures part of the window, and, in order to permit it to detect misting conditions, that part of the window will not be heated.

SUMMARY OF THE INVENTION

The present invention provides a heated exterior mirror for motor vehicles comprises a mirror glass with a reflecting coating deposited on a rear surface thereof; a transparent conductive coating on a front surface of the mirror glass, divided into at least two zones by a narrow non-conductive gap; an electrical heating element thermally bonded to a rear surface of the mirror glass behind the reflective coating; a circuit connected between two zones of the transparent conductive coating to sense changes at least one of the capacitance and resistance of the gap due to deposition of moisture on said front surface and providing an output indicative of the presence of moisture; and switching means receiving said output and switching power to said electrical heating element responsive to the detection of moisture on such front surface. The division of the transparent, conductive coating on the front surface, into at least two areas separated electrically from one another, creates boundary surfaces between electrically conductive areas which are opposite to one another and insulated from one another, so that it is possible to utilize the coating as a resistive and/or capacitative humidity sensor. The insulation resistance between the areas which are electrically insulated from one another is considerably reduced by condensing moisture, so that a reduction in the resistance value (and/or increase in capacitance) indicates that the mirror has fogged up, signalling in turn that it is necessary to heat the mirror. In principle, such a fogging-up of a mirror can occur at almost any temperature because it merely requires that the mirror, due to external conditions, is cooler than the dew-point of the ambient air. The separate connections to the areas separated electrically from one another by a narrow elongated gap allow the state of a substantial portion of the mirror surface to be monitored by an appropriate circuit arrangement, the changing value of the electrical resistance as well as of the capacitance of the layer allowing an effective humidity sensor to be produced.

The application of a conductive, transparent coating to the front surface of the mirror allows inexpensive and simple manufacture of a humidity sensor, which is integrated into the mirror itself and whose signals can be connected directly to a circuit controlling the heating element. In an especially advantageous embodiment the mirror is designed to that the heating may be turned on either in accordance with the resistance or capacitance between the electrically conductive areas on the front mirror surface in response to moisture or in accordance with signals from a temperature sensor, the sensing of moisture causing the element to turn on even when the temperature sensor does not indicate that the temperature has fallen below a preset threshold. Taking into account that fogging-up of the mirror is the primary reason for activating the mirror heating system, it makes sense to switch on the mirror heating in response to fogging-up of the mirror resulting from the condensation of moisture.

In order to heat the mirror surface as quickly as possible, it is necessary to keep the masses to be heated low and to ensure that heat reaches mainly the mirror glass and not other areas, for example, a mirror housing or the ambient air. This is favoured by forming the electrical heating elements as a surface coating of electrically conductive material applied to the rear surface of the mirror: such a surface coating can be made thin and, therefore of low mass. Preferably such surface coating of electrically conductive material forming the heating elements, as well as the conductive, transparent coating of the front surface are applied in a plasma process, in particular by arc atomization or in a thin-film coating process.

By using the art atomization or the thin-film coating process, metallic conductors can be applied directly to the mirror glass as a film or a few Angstrom units or a few microns in thickness without an intermediate layer of adhesive or other adhesion-increasing substances, which in turn reduces the mass to be heated, making possible particularly quick heating. This also reduces considerably the energy required to heat the mirror compared to known systems.

In accordance with another preferred feature, the switch used for the heating elements is a semiconductor switch, such as a power transistor, whose heat sink is thermally bonded to the mirror. Thus heat losses resulting during the switching process are recovered in a useful manner so that energy consumption is reduced.

The transparent, conductive coating used to make the humidity sensor can be formed in a simple manner as a chromium layer, plasma etching (for example) being used to produce the division into areas separated electrically from one another. Such an etching process with a suitably thin, transparent, conductive coating allows the width of the gap produced by etching to be regulated exactly, which is particularly advantageous both in setting the capacitance of the coating and in obtaining reproducible results in resistance measurement. In addition, such a coating and etching have the advantage of being essentially invisible, so that the mirror continues to function without impairment.

In order to ensure that the heating system can reliably prevent the mirror from fogging up at all external temperatures likely to be encountered, the mirror is preferably designed in such a way that the heating capacity of the heating element is refulated so that their surface temperature remains below 200° C., preferably below 150° C. In order to achieve even quicker distribution of heat in those areas in which moisture condenses, the mirror may be constructed with an additional separate heating element provided on the same side of the mirror as the electrically conductive coating, although it should be arranged so as not to reduce significantly the functionality of the mirror.

The invention is explained in more detail below with reference to a specific embodiment.

SHORT DESCRIPTION OF THE DRAWINGS

DESCRIPTION OF THE PREFERRED EMBODIMENT

Figure 1:
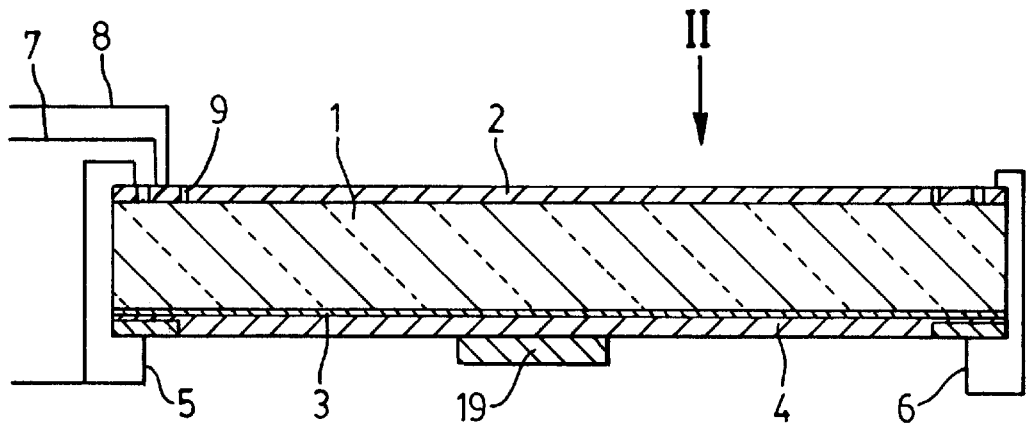
FIG. 1 is a cross-section through a mirror element of a vehicle exterior mirror.

FIG. 1 shows a mirror glass 1 on which a transparent, conductive chromium coating 2 is applied to the front surface by means of arc atomization. A conductive coating, forming a heating element 4, is applied to the rear surface of the specular reflective coating 3 applied to the mirror glass. Connections 5 and 6 are provided for the heating element 4, whereas connections 7 and 8, made to areas of the coating 2 electrically separated from one another by an etched gap 9. An additional heating element may be provided on the front surface of the mirror, for example around its periphery as shown at 18.

Figure 2:
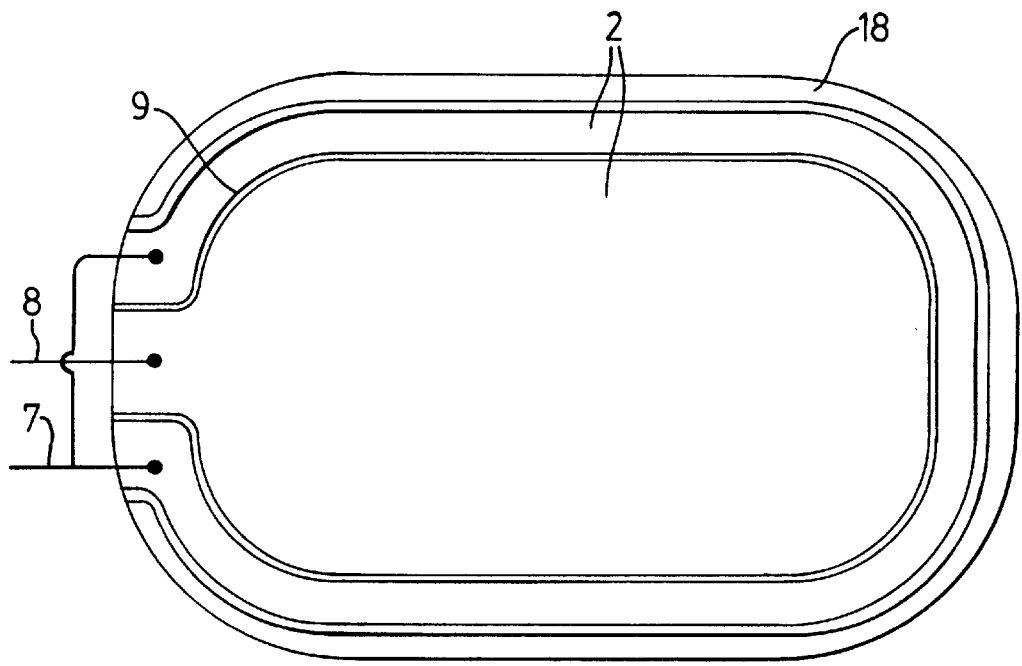
FIG. 2 is a plan view of the external surface of the mirror from the direction of arrow II in FIG. 1.
Figure 3:
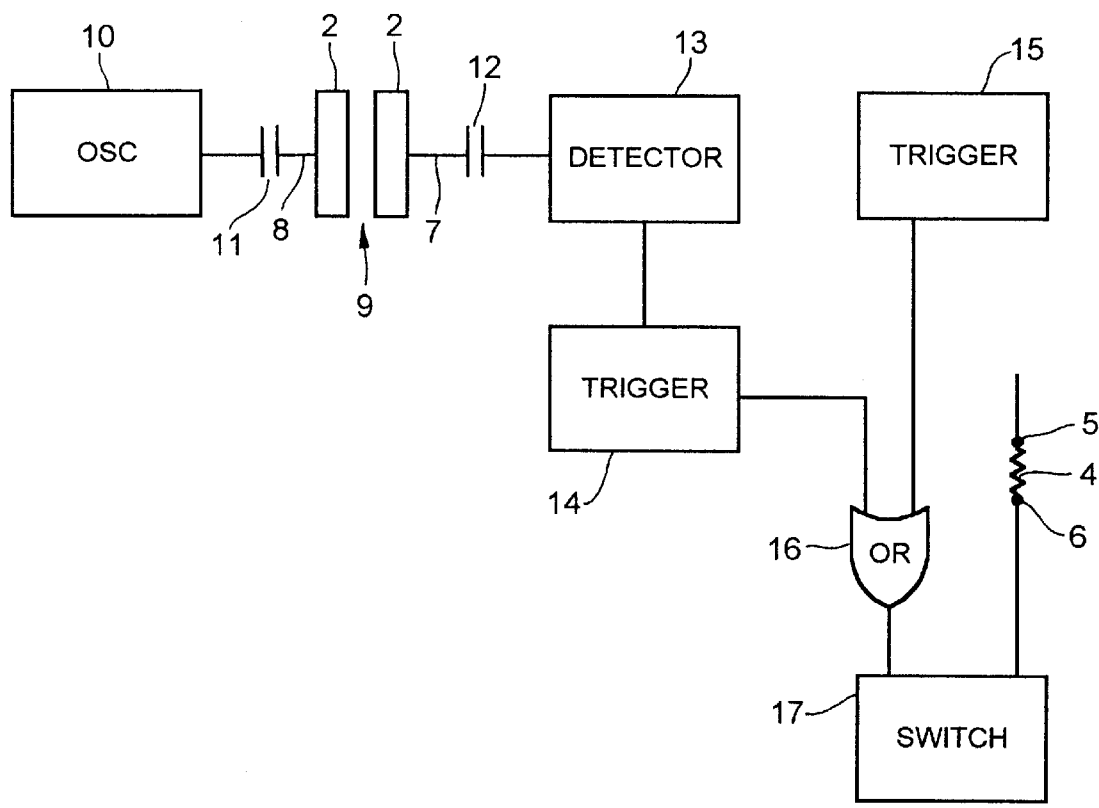
FIG. 3 is a block diagram of a control circuit.

The front surface of the mirror, shich acts as a humidity sensor, is shown in more detail in FIG. 2. The coating 2 is sub-divided into areas insulated electrically from one another by the etched gap 9. When moisture condenses on the front surface, the gap 9 is bridged by a thin film of water, which reduces the resistance value between the conductors 7 and 8. In an analogous manner the capacity between these two conductors also changes because of the high dielectric constant of water. These changes are detected by the circuit of FIG. 3, as described below.

Referring to FIG. 2, an oscillator 10 generates a high frequency electrical signal which is applied to the connection 8 through a capacitor 11, and the contact 7 is connected through a capacitor 12 to an envelope detector 13, the output of which is applied to a trigger circuit 14, the output of which is in turn applied, together with that of a temperature sensing circuit trigger circuit 15 employing a thermistor, to an OR gate 16. The output of gate 16 controls an electronic switch 17, for example a field effect power transistor, which completes a circuit through the connections 5 and 6 and the heating element 4. Conveniently the oscillator 10, the trigger circuits and the OR gate are implemented utilizing a quadruple 2-input NAND Schmitt trigger chip such as is available from RCA and other manufacturers under the number 4093B. The built-in hysteresis of such triggers permits them to be used to implement oscillators, and to implement trigger circuits with threshold hysteresis, as well as performing normal NAND or OR logic functions.

In the present case, and in the absence of condensation or other moisture, the capacitance between the connections 7 and 8 will be low and the resistance very high. Insufficient signal will therefore reach the detector 13 from the oscillator to provide an output above the turn-on threshold of the circuit 15; in fact this output should also be below the turn-off threshold. As condensation builds up on the etching 9, the capacity between the connections 7 and 8 will increase and the resistance will decrease. The resistance effect will be influenced by the presence of contaminants on the mirror surface or in the moisture, but this will not significantly alter the capacitance effect so that a substantial increase in signal transfer to the detector can be relied up as moisture builds up. Component values are selected so that any substantial increase in signal transfer will provide a detector output sufficient to exceed the turn-on threshold of the circuit 14, thus turning on the heating element. The circuit 14 will not turn off until the detector output falls below the turn-off threshold of the circuit 14, and this in conjunction with the thermal inertia of the mirror, should ensure that it is fully demisted. The circuit 15, which is optional, is set up so that the element 4 will be turned on when the temperature, as sensed by a thermistor, falls below a predetermined threshold, and turned off when it rises above a somewhat higher threshold, thus also providing thermostatic control of the element 4. The circuit 15 will however operate in the presence of fogging to turn on the element 4, even if the ambient temperature has not fallen below the turn-on threshold of circuit 15.

Alternatively, a thermistor controlled trigger circuit may be arranged to override the signal from the moisture detecting circuit when the temperature of the mirror rises to a level at which condensation is unlikely, thus avoiding unnecessary heating of the mirror should the moisture sensing circuit malfunction, for example because of excessive conductive contaminants on the mirror.

The etching 9 may have a width of, for example, 10 microns, and should therefore be substantially invisible. A current of 1.8 amperes at 12 volts, which is readily controlled by a power transistor forming switch 17, will provide sufficient heating capacity for typical external mirror. A heat sink 19 of the power which forms switch 17 may advantageously be bonded to the element 4 as seen in FIG. 1 so that any heat generated in the transistor is not wasted.

I claim:

1. A heated exterior mirror for motor vehicles, comprising:

a mirror glass with a reflecting coating on a rear surface thereof;

a transparent conductive coating covering most of a front surface of the mirror glass, said coating being divided into two zones electrically isolated from each other by a narrow non-conductive gap;

an electrical heating element thermally bonded to a rear surface of the mirror glass behind the reflective coating;

a circuit connected between said two zones of the transparent conductive coating to sense changes in at least one of the capacitance and resistance of the gap due to deposition of moisture on said front surface and providing an output indicative of the presence of moisture;

switching means receiving said output and switching power to said electrical heating element responsive to the detection of moisture on said front surface; and an additional heating element applied to a peripheral zone of the front surface of the mirror substantially surrounding said transparent coating.

2. A mirror according to claim 1, further comprising a temperature sensing circuit providing an output in response to sensing a threshold temperature, said switching means receiving the output from the temperature sensor and switching power to said electrical heating element responsive thereto.

3. A mirror according to claim 1, wherein the transparent conductive coating is applied by a plasma process.

4. A mirror according to claim 1, wherein the electrical heating element is a conductive coating applied to the rear surface of the mirror glass.

5. A mirror according to claim 4, wherein the conductive coating forming the heating element is applied by a plasma process.

6. A mirror according to claim 1, wherein the switching means is a power transistor having a heat sink bonded to the rear surface of the mirror.

7. A mirror according to claim 1 wherein the transparent conductive coating is formed of chromium.

8. A mirror according to claim 1, wherein one zone of the coating substantially surrounds the other zone of the coating.

9. A mirror according to claim 1, wherein the circuit connected between the two zones of the transparent conductive coating includes an oscillator generating a high frequency electrical signal and a capacitor in series with said zones.

\* \* \* \* \*